United States Patent
Kuwabara

(10) Patent No.: US 12,326,587 B2
(45) Date of Patent: Jun. 10, 2025

(54) OPTICAL ELEMENT

(71) Applicant: CANON KABUSHIKI KAISHA, Tokyo (JP)

(72) Inventor: Seiji Kuwabara, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 517 days.

(21) Appl. No.: 17/746,148

(22) Filed: May 17, 2022

(65) Prior Publication Data

US 2022/0381965 A1 Dec. 1, 2022

(30) Foreign Application Priority Data

May 25, 2021 (JP) .................................. 2021-087898

(51) Int. Cl.
   *G02B 5/30* (2006.01)
(52) U.S. Cl.
   CPC .................................. *G02B 5/3058* (2013.01)
(58) Field of Classification Search
   None
   See application file for complete search history.

(56) References Cited

U.S. PATENT DOCUMENTS

| 6,679,996 B1 * | 1/2004 | Yao .................. H01L 21/02282 |
| | | 216/48 |
| 7,957,062 B2 | 6/2011 | Takada |
| RE45,642 E | 8/2015 | Takada |
| RE46,560 E | 9/2017 | Takada |
| 9,784,898 B2 | 10/2017 | Koike |
| RE48,640 E | 7/2021 | Takada |
| 11,435,512 B2 * | 9/2022 | Nielson ............... G02B 5/3058 |
| 2007/0087549 A1 * | 4/2007 | Yamaki ............... G02B 5/3058 |
| | | 438/613 |
| 2008/0129931 A1 * | 6/2008 | Takahashi ........... G02B 5/3058 |
| | | 359/487.03 |
| 2008/0252862 A1 | 10/2008 | Okura et al. |
| 2008/0303986 A1 | 12/2008 | Yamaki et al. |
| 2011/0052802 A1 * | 3/2011 | Kaida ............... G02F 1/133536 |
| | | 427/163.1 |
| 2011/0080640 A1 * | 4/2011 | Kaida .................. G02B 5/3058 |
| | | 359/485.05 |
| 2011/0286094 A1 * | 11/2011 | Kaida .................. G02B 5/3058 |
| | | 359/485.05 |

FOREIGN PATENT DOCUMENTS

| CN | 105264411 A | 1/2016 |
| JP | 7-301710 A | 11/1995 |
| JP | 2001-110801 A | 4/2001 |
| JP | 2002-031718 A | 1/2002 |
| JP | 2006-133331 A | 5/2006 |

(Continued)

OTHER PUBLICATIONS

Notice of Reasons for Refusal in Japanese Application No. 2021-087898 (Jan. 2025).

*Primary Examiner* — Robert E. Tallman
(74) *Attorney, Agent, or Firm* — Venable LLP

(57) ABSTRACT

Provided is an optical element in which a metal layer with good adhesion is formed on a resin substrate. An optical element includes: a resin substrate; and a stacked body including a metal oxide layer provided on the resin substrate and a metal layer provided on the metal oxide layer. The metal oxide layer is a lanthanum oxide of ternary or more.

15 Claims, 2 Drawing Sheets

(56) References Cited

FOREIGN PATENT DOCUMENTS

| | | | |
|---|---|---|---|
| JP | 2006-292784 | A | 10/2006 |
| JP | 2007052098 | A | 3/2007 |
| JP | 2007-148344 | A | 6/2007 |
| JP | 2008-083656 | A | 4/2008 |
| JP | 2008-216957 | A | 9/2008 |
| JP | 2010-204380 | A | 9/2010 |
| JP | 2010-266483 | A | 11/2010 |
| JP | 2011-095658 | A | 5/2011 |
| JP | 2016-009083 | A | 1/2016 |
| JP | 2017-214607 | A | 12/2017 |
| JP | 2019-35100 | A | 3/2019 |

* cited by examiner

OPTICAL ELEMENT

BACKGROUND OF THE INVENTION

Field of the Invention

The present invention relates to an optical element in which metal is stacked on a resin substrate, particularly to a phase control element using an oblique angle deposition film.

Description of the Related Art

In various optical devices, various phase control elements have been conventionally used in many cases to control the phase of light. An optical element using an oblique angle deposition film is one of these phase control elements. The oblique angle deposition film is a vapor deposition film formed by using a vapor deposition source placed in a direction tilted by a fixed angle with respect to the normal direction of a substrate surface, and has a fine structure that is anisotropic in a plane. Then, the vapor deposition film having the anisotropic fine structure as described above is used in a polarization plate, a retarder, and the like. In recent years, technologies such as virtual reality (VR), mixed reality (MR), and augmented reality (AR) that are collectively referred to as xR technology are put into practical use and a new market is expanding. Polarization plates are used also in optical elements forming displays used in these technologies. Particularly, a wire grid polarization film using a resin as a substrate (base) can be used on a curved surface and has good workability. Thus, the wire grid polarization film has a wide usage range in the field of optical devices and is useful.

Japanese Patent Application Laid-Open No. 2002-031718 discloses a polarization plate made to be optically anisotropic by forming a metal on a transparent resin substrate by oblique angle deposition. This polarization plate is a plate in which vapor deposition particles are deposited at a deposition angle of 82° or more with respect to the normal of a substrate surface that is a deposition surface to grow a metal-based optical absorber on the deposition surface, and is regarded to have excellent transmittance of transmitted polarized light and an excellent extinction ratio. Meanwhile, Japanese Patent Application Laid-Open No. 2008-083656 discloses a wire grid polarization plate in which a dielectric layer is formed on a resin substrate having lattice shaped protruding portions on a surface and a metal wire is formed on the dielectric layer.

In the technique described in Japanese Patent Application Laid-Open No. 2002-031718, adhesion between the resin substrate and the metal anisotropic film is not sufficiently considered. Meanwhile, in the technique described in Japanese Patent Application Laid-Open No. 2008-083656, adhesion between the lattice shaped protruding portions of the resin substrate and the metal wire grid via the dielectric layer is not sufficiently considered. Accordingly, when the metal layer and the dielectric layer being an underlayer of the metal layer have fine structures, these layers are very fragile and thus there is a possibility that the structure of the element eventually breaks and desired optical characteristics cannot be obtained if the adhesion is poor. Thus, an object of the present invention is to provide an optical element that includes a vapor deposition film with a fine structure being anisotropic in a plane and in which a metal layer with good adhesion to a resin substrate is formed on the resin substrate via a dielectric layer.

SUMMARY OF THE INVENTION

An optical element of the present invention is an optical element including: a resin substrate; and a stacked body including a metal oxide layer provided on the resin substrate and a metal layer provided on the metal oxide layer. At least one of the metal oxide layer and the metal layer is subjected to patterning, and the metal oxide layer is a lanthanum oxide of ternary or more. The optical element of the present invention may be a wire grid polarization plate in which a surface of the resin substrate has lattice-shaped protruding portions. A filling ratio of the lanthanum oxide of ternary or more is preferably 40% or more and 60% or less. The lanthanum oxide of ternary or more preferably contains at least one of Ti (titanium) and Al (aluminum) as a metal element other than La (lanthanum).

Further features of the present invention will become apparent from the following description of exemplary embodiments with reference to the attached drawings.

BRIEF DESCRIPTION OF THE DRAWINGS

FIG. 1A illustrates an example in which a surface of a resin substrate is flat and FIG. 1B illustrates an example in which the surface of the resin substrate has lattice shaped protruding portions.

FIG. 2A illustrates an example in which a vapor deposition layer is formed on the surface of the flat resin substrate and FIG. 2B illustrates an example in which the vapor deposition layer is formed on the surface of the resin substrate having the lattice shaped protruding portions.

DESCRIPTION OF THE EMBODIMENTS

Figure 1A:
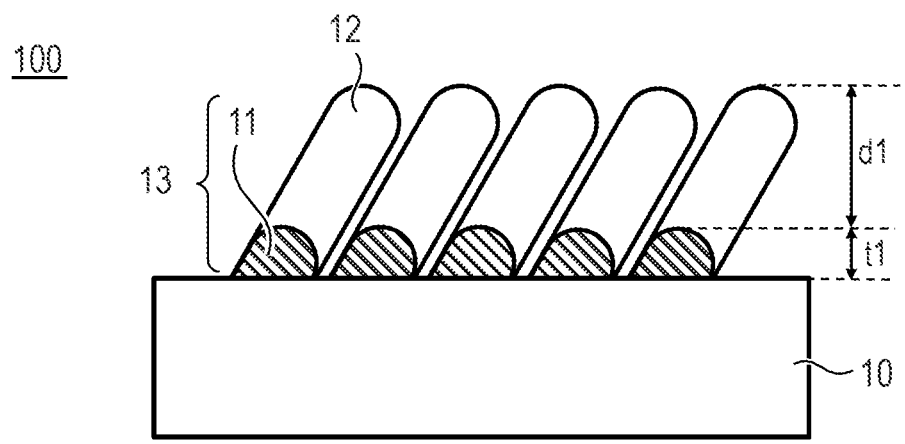
FIGS. 1A and 1B are schematic cross-sectional diagrams illustrating two examples of the optical element in the present invention.

An embodiment of the present invention is described below with reference to the drawings. Note that, in the following description and drawings, the same configurations across multiple drawings are denoted by the same reference numerals. Moreover, the same configurations are sometimes described with reference to multiple drawings without being noted. Furthermore, description of the configurations denoted by the same reference numerals is sometimes omitted.

FIG. 1A illustrates an example of an optical element of the present invention. An optical element 100 includes a resin substrate (substrate made of resin) 10 and a stacked body 13 including a metal oxide layer 11 provided on the resin substrate 10 and a metal layer 12 provided on the metal oxide layer 11. The metal oxide layer 11 is provided between the resin substrate 10 and the metal layer 12. The metal oxide layer 11 has strong adhesion to the resin substrate 10 and strong adhesion to the metal layer 12 and the adhesion of the metal layer 12 in the optical element 100 is thereby improved. The optical element 100 may be used such that light enters the stacked body 13 from the opposite side to the resin substrate 10 or such that light enters the stacked body 13 from the resin substrate 10 side. Although a surface of the resin substrate 10 on which the stacked body 13 is provided is flat in FIG. 1A, in the present invention, the surface of the resin substrate 10 does not have to be flat and may be, for example, a curved surface. Moreover, although the metal oxide layer 11 on the resin substrate 10 and the metal layer 12 on the metal oxide layer 11 are formed by oblique angle deposition in FIG. 1A, in the present invention, the metal layer 12 does not have to be a layer formed by oblique angle deposition and may be formed in a method according to purpose. However, when the optical element of the present invention is a polarization plate, it is preferable that the metal layer 12 is formed by oblique angle deposition with an angle between a deposition direction and a direction of the normal being 70° to 85°.

Figure 1B:
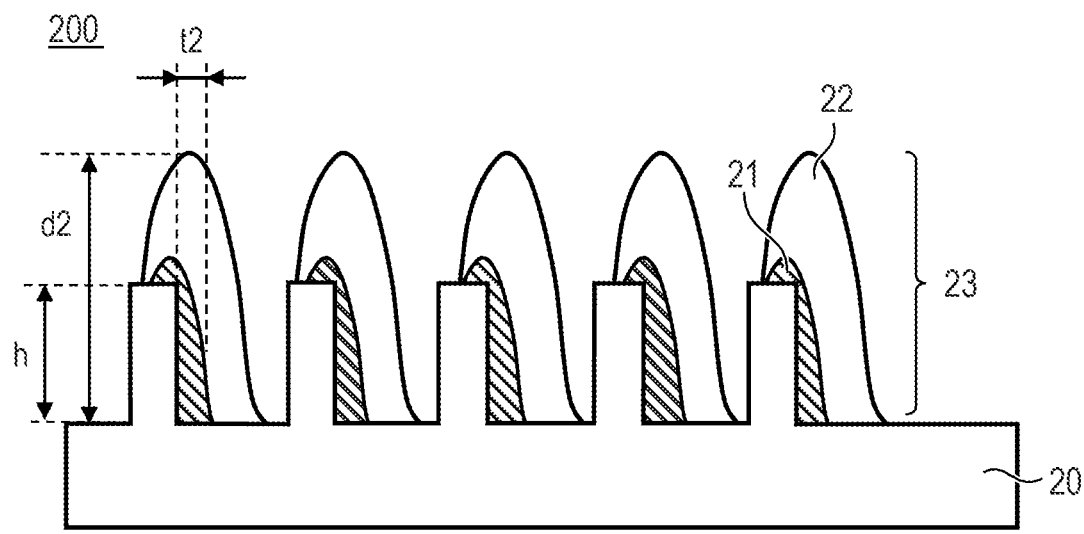

FIG. 1B illustrates another example of the optical element of the present invention. An optical element 200 includes a resin substrate 20 and a stacked body 23 including a metal oxide layer 21 provided on the resin substrate 20 and a metal layer 22 provided on the metal oxide layer 21. The metal oxide layer 21 is provided between the resin substrate 20 and the metal layer 22. The metal oxide layer 21 has strong adhesion to the resin substrate 20 and strong adhesion to the metal layer 22 and the adhesion of the metal layer 22 in the optical element 200 including the resin substrate 20 is thereby improved. The optical element 200 may be used such that light enters the stacked body 23 from the opposite side to the resin substrate 20 or such that light enters the stacked body 23 from the resin substrate 20 side. The optical element 200 illustrated in FIG. 1B is a so-called wire grid polarization plate and the resin substrate 20 includes protruding portions formed in a lattice shape at a fixed pitch on a surface on which the stacked body 23 is formed. Moreover, the stacked body 23 is formed by oblique angle deposition in areas from side surfaces to top surfaces of the protruding portions.

The stacked body 13 in the optical element 100 illustrated in FIG. 1A may also be used as a reflection film in which the stacked body 13 selectively reflects light with a predetermined wavelength in a predetermined polarization state, depending on polarization. Alternatively, the stacked body 13 in the optical element 100 may also be used as a filter film in which the stacked body 13 selectively transmits light with a predetermined wavelength in a predetermined polarization state, depending on polarization. As another alternative, the stacked body 13 may be used as a reflection prevention film that suppresses reflection in the optical element 100. The optical element 100, 200 can be employed in an optical device including the optical element 100, 200 and at least one of an imaging element and a display element. The display element may be a transmission element such as a liquid crystal element, a reflection element such as a LCOS element or a DMD element, or a light emitting element such as an EL element. Such an optical device is, for example, a head mount display. For example, Japanese Patent Application Laid-Open No. 2016-009083 can be given as a reference of the head mount display including the polarization plate and at least one of the imaging element and the display element (projector).

In the optical element 100 of FIG. 1A and the optical element 200 of 1B, the thickness t1, t2 of the metal oxide layer 11, 21 is preferably 2 nm or more and 200 nm or less. Moreover, in the optical element 100 and the optical element 200, the thickness d1, d2 of the metal layer 12, 22 is preferably 10 nm or more and 500 nm or less.

When the optical element 100, 200 is the polarization plate, the resin substrate 10, 20 is made of a resin transparent in a wavelength range in which the optical element 100, 200 is to be used. Such a resin includes, for example, cyclo-olefin polymer (COP), an acrylic resin such as polymethyl-methacrylate (PMMA), polyethylene terephthalate (PET), polycarbonate (PC), polyvinyl chloride, and the like. Note that the lattice shaped protruding portions on the surface of the resin substrate 20 are preferably formed at a fixed pitch of several tens of nanometers to several hundreds of nanometers and the height h of each protruding portion is preferably about one to two times the pitch.

The metal oxide layer 11, 21 is made of an oxide of ternary or more that contains lanthanum (La). In this case, the "oxide of ternary or more" refers to an oxide formed of oxygen and two or more metal elements, and the oxide preferably contains at least one of titanium (Ti) and aluminum (Al) as a metal element other than La. Such an oxide is preferably lanthanum titanate ($La_2Ti_2O_7$, $LaTiO_3$) expressed by a composition formula $La_xTi_yO_z$ (x, y, and z are composition ratio, 3x+(3 to 4)y=2z), lanthanum aluminate ($LaAlO_3$) expressed by a composition formula $La_xAl_yO_3$ (x, y, and z are composition ratio, 3x+3y=2z), or a mixture of these oxides.

The metal layer 12, 22 may be a layer made of one of metals such as Al, gold (Au), silver (Ag), copper (Cu), and the like or a layer made of any of various alloys. In the optical element, at least one of the metal layer 12, 22 and the metal oxide layer 11, 21 that is provided on the resin substrate 10, 20 and that contains the lanthanum (La)-containing oxide of ternary or more is subjected patterning. In this case, patterning means forming at least one of the metal oxide layer 11, 21 and the metal layer 12, 22 in any of various patterns such as grid, dot, and the like. A method of patterning includes, for example, a method of forming the resin substrate 10 in a desired pattern and depositing the metal oxide layer 11, 21 and the metal layer 12, 22 on the resin substrate 10 and the like. Moreover, there are methods such as an etching method, a method using an electron-beam lithography apparatus, a method using a printing technique, mask deposition, and lift-off. The metal oxide layer 11, 21 and the metal layer 12, 22 may be formed on the entire surface of the resin substrate 10, 20 to form a mirror. Even if the optical element is formed as a mirror, this optical device can be considered as the optical element of the present invention as long as at least one of the resin substrate 10, the metal oxide layer 11, 21, and the metal layer 12, 22 is partially subjected to patterning as in the other optical elements.

A publicly known physical vapor deposition method (sputtering method, vacuum deposition method, and the like) may be used as a method of stacking the metal oxide layer on the resin substrate. From the viewpoint of cost, it is advantageous to successively and continuously stack the metal oxide layer and the metal layer, subsequently stacked on the metal oxide layer, in the same apparatus. For example, when a phase control element that changes a polarization state is to be manufactured as the optical element, the metal layer is stacked by oblique angle deposition. Accordingly, the metal oxide layer formed prior to the metal layer is preferably formed by vacuum deposition.

When the oblique angle deposition is performed, a positional relationship between the resin substrate and an evaporation source in a vacuum deposition apparatus is preferably such that a direction of the normal of a resin substrate surface being a deposition surface and a direction of a line extending from the evaporation source to the substrate, that is a deposition direction are arranged to form an angle of 70 to 85 degrees. In the resin substrate having the lattice shaped protruding portions on the surface like the optical element 200 illustrated in FIG. 1B, the metal layer is stacked on an area from the side surface to an upper portion of each protruding portion. Accordingly, the deposition direction and the normal direction of the side surface of the protruding portion are preferably arranged to form an angle of 70 to 85 degrees. As a result, an angle formed between the deposition direction and the normal direction of the surface of the resin substrate itself (excluding the protruding portions) is 5 to 20 degrees. The normal direction of the side surface of each protruding portion included in the resin substrate of the optical element 200 thereby has the same positional relationship to the deposition direction, as the normal direction of the resin substrate surface in the optical element 100. Accordingly, when the resin substrate 20 having the protruding portions is subjected to oblique angle deposition, the same effects as those in the case where the flat resin substrate 10 is subjected to oblique angle deposition can be obtained. The layer of the La-containing oxide of ternary or more that is contained in the metal oxide layer preferably has a filling ratio (value of density normalized with the density in the vapor deposition at the deposition angle of 0° being 100%) of 40% or more and 60% or less due to oblique angle deposition.

Figure 2A:
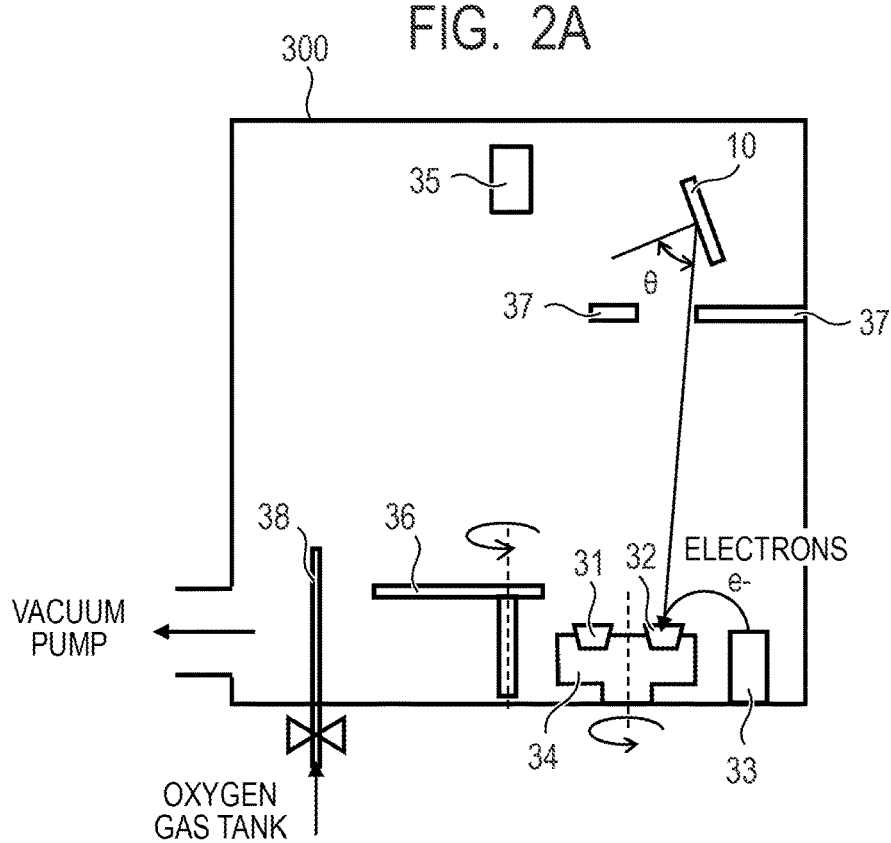
FIGS. 2A and 2B are schematic diagrams illustrating two examples of a vacuum deposition apparatus that can be used to manufacture the optical element of the present invention.
Figure 2B:
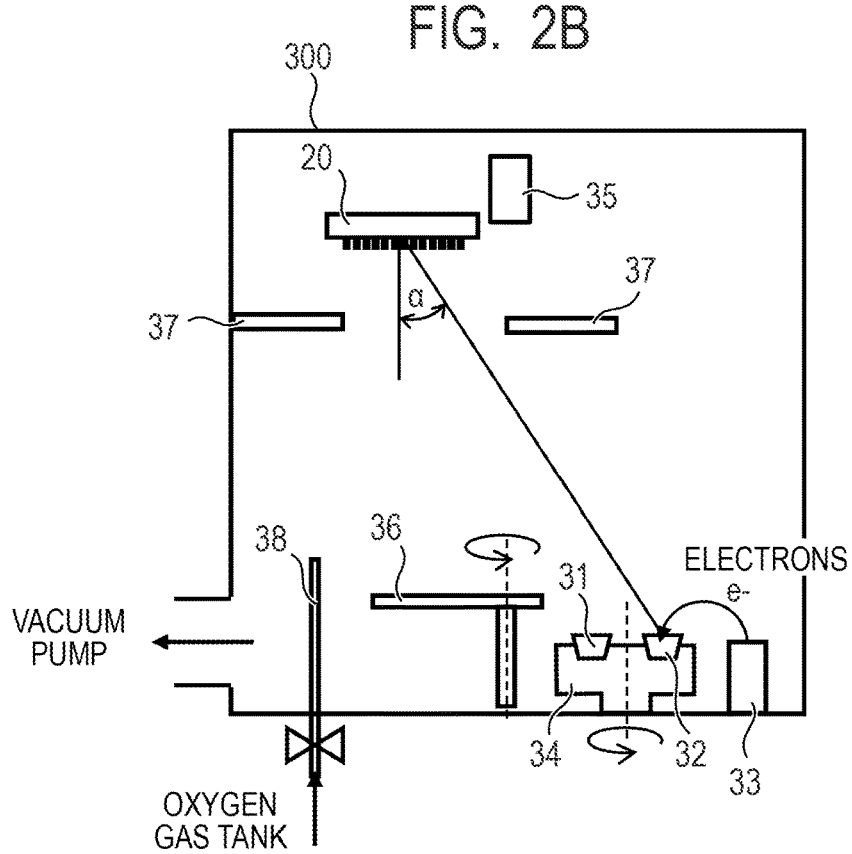

An outline of a vacuum deposition apparatus that can be preferably used to manufacture the optical element of the present invention is described by using FIGS. 2A and 2B. FIG. 2A illustrates arrangement in the case where the metal oxide layer (as well as the metal layer) is formed by oblique angle deposition on the resin substrate having the flat surface as illustrated in FIG. 1A. FIG. 2B illustrates arrangement in the case where the metal oxide layer (as well as the metal layer) is formed by oblique angle deposition on the resin substrate having the surface on which the lattice shaped protruding portions are formed as illustrated in FIG. 1B. FIGS. 2A and 2B vary only in the direction of the resin substrate 10, 20 and a positional relationship to evaporation sources (crucibles) 31 and 32, as well as a position and an opening size of a mask 37 that vary due to the aforementioned variations. Accordingly, the following description applies to both cases unless otherwise noted.

A dielectric material and a metal material that are deposition materials are put into the crucibles 31 and 32, respectively, in a vacuum deposition apparatus 300 from which air is discharged by a vacuum pump. The material of the crucibles is molybdenum, tungsten, carbon, or the like and can be selected depending on the deposition materials. Since the crucibles 31 and 32 are arranged on a revolver-type material switching mechanism 34, the metal oxide layer and the metal layer can be successively and continuously stacked on the surface of the resin substrate 10, 20. An electron gun 33 heats the deposition materials and the evaporated materials are thrown toward the resin substrate 10, 20 by opening a shutter 36 in stacking. In this case, a quartz crystal film thickness monitor 35 measures the layer thickness and controls a stacking rate. The mask 37 is installed below the resin substrate 10, 20 and the deposition direction can be limited by allowing only the material beam having passed an opening portion of the mask 37 to reach the resin substrate. The distance from the crucible 31, 32 (one of the two that is being used for the deposition at that moment) to the resin substrate may be normally set to about 500 mm. However, the distance is not necessarily limited to about 500 mm as long as the distance is sufficiently long with respect to the size of the resin substrate and a deposition angle θ between the deposition direction and the normal direction in the surface of the resin material can be considered to be substantially constant. For example, stacking on many substrates can be simultaneously performed by moving the substrates in the vapor deposition apparatus such that the deposition angle θ is maintained substantially constant. Note that a gas line 38 is a line for introducing an oxygen gas into a vessel to maintain the pressure in the vessel constant while discharging air in the vessel with the vacuum pump.

A polarization plate having the metal layer firmly bonded onto the resin substrate via the metal oxide layer as illustrated in FIG. 1A and the metal wire grid polarization element as illustrated in FIG. 1B can be obtained by successively forming the metal oxide layer and the metal layer on the resin substrate with the vacuum deposition apparatus as illustrated in FIGS. 2A and 2B. In this case, the metal oxide layer and the metal layer can be successively stacked in the same vacuum deposition apparatus. Thus, the work of loading and unloading the resin substrate is reduced and the manufacturing cost can be suppressed to a low level.

EXAMPLE

Example 1

ZEONEX (registered trademark) K22R (length 30 mm×width 30 mm×thickness 2.0 mm) of ZEON Corporation made of cyclo-olefin polymer (COP) was installed in the vacuum deposition apparatus 300 illustrated in FIG. 2A as the resin substrate 10 such that the deposition angle θ was 85°. Then, the crucible 31 was filled with $La_2Ti_2O_7$ [OH-14 (registered trademark) manufactured by Canon Optron, Inc.] as the deposition material of the metal oxide layer and the crucible 32 was filled with Al as the deposition material of the metal layer. Thereafter, air in the vacuum deposition apparatus was discharged with a vacuum pump, $La_2Ti_2O_7$ in the crucible 31 was heated with the electron gun 33 after the pressure reached $8.0 \times 10^{-4}$ Pa, the shutter 36 was opened, and oblique angle deposition was performed until a metal oxide layer made of $La_2Ti_2O_7$ was formed to a film thickness t1=20 nm. The stacking rate in this case was controlled by the quartz crystal film thickness monitor 35 to be 0.4 nm/sec and the pressure during the stacking was maintained at $1.0 \times 10^{-2}$ Pa by causing an oxygen gas to flow from the gas line 38. Next, the revolver-type material switching mechanism 34 switched the evaporation source to the crucible 32 filled with Al, then Al was heated with the electron gun 33, the shutter 36 was opened, and oblique angle deposition was performed until a metal layer made of Al was formed to a film thickness d1=150 nm. The stacking rate in this case was set to 2.5 nm/sec. Note that the final film thickness was obtained in cross-sectional scanning electron microscope (SEM) observation.

Examples 2 to 4

In Example 2, the metal oxide layer and the metal layer were stacked as in Example 1 except for changing the material of the metal oxide layer to $La_xAl_yO_z$ [SUBSTANCE M3 (registered trademark) manufactured by Merck KGaA]. In Examples 3 and 4, the metal oxide layer and the metal layer were stacked in the same conditions as in Examples 1 and 2, respectively, except for changing the deposition angle θ to 70°.

Comparative Examples 1 to 12

In Comparative Example 1, no metal oxide layer was stacked and the Al layer was directly stacked as in Example 1. In Comparative Examples 2 to 6, the stacking of the optical element was performed as in Example 1 except for changing the material of the metal oxide layer. The materials of the metal oxide layer in Comparative Examples 2 to 6 were selected from a wide range of materials generally used in an optical film and $TiO_2$, $Ta_2O_5$, $HfO_2$, $Al_2O_3$, and $Y_2O_3$ were used in Comparative Examples 2 to 6, respectively. Note that the stacking rates of the metal oxide layer in Comparative Examples 2 to 6 were 0.2 nm/sec, 0.2 nm/sec, 0.4 nm/sec, 0.3 nm/sec, and 0.4 nm/sec, respectively, and the pressures in stacking in the Comparative Examples 2 to 6 were $1.5 \times 10^{-2}$ Pa, $1.5 \times 10^{-2}$ Pa, $8.0 \times 10^{-3}$ Pa, $1.0 \times 10^{-2}$ Pa, and $8.0 \times 10^{-3}$ Pa, respectively. In Comparative Examples 7 to 12, the stacking was performed in the same conditions as in Comparative Examples 1 to 6, respectively, except for changing the deposition angle θ to 70°.

Film peeling evaluation by a tape test using Cellotape (registered trademark) (CT-15) manufactured by NICHIBAN Co., Ltd. was performed on the stacked body fabricated in each of Examples 1 to 4 and Comparative Examples 1 to 12. In the tape test, a cut tape was laid on the element, stroked with the finger to be made flat, and was made to adhere to the element surface with the fingertip. After lapse of five minutes from adhesion of the tape to the element, an end of the tape was pulled in a direction of 60 degrees with respect to the element surface (such that an angle formed between the tape remaining on the element surface and the tape peeled off from the element surface was 60 degrees) and the tape was peeled off in 0.5 to 1 seconds. An example in which the stacked body on the element did not peel off is denoted by "good" and an example in which the stacked body peeled off is denoted by "poor". Moreover, the density of the metal oxide layer was obtained by X-ray reflectometry (XRR). Furthermore, the density was normalized by using the density of the metal oxide layer stacked at θ=0, and was calculated as a filling ratio. The aforementioned results are illustrated in Table 1.

TABLE 1

| | Deposition angle θ degrees | Dielectric material | Tape test | Filling ratio % |
|---|---|---|---|---|
| Example 1 | 85 degrees | $La_2Ti_2O_7$ | good | 43% |
| Example 2 | 85 degrees | $Al_xLa_yO_z$ | good | 48.20% |
| Example 3 | 70 degrees | $La_2Ti_2O_7$ | good | 72.20% |
| Example 4 | 70 degrees | $Al_xLa_yO_z$ | good | 77.20% |
| Comparative Example 1 | 85 degrees | — | poor | — |
| Comparative Example 2 | 85 degrees | $TiO_2$ | poor | 25.50% |
| Comparative Example 3 | 85 degrees | $Ta_2O_5$ | poor | 27.70% |
| Comparative Example 4 | 85 degrees | $HfO_2$ | poor | 31.40% |
| Comparative Example 5 | 85 degrees | $Al_2O_3$ | poor | 39.10% |
| Comparative Example 6 | 85 degrees | $Y_2O_3$ | poor | 33.30% |
| Comparative Example 7 | 70 degrees | — | poor | — |
| Comparative Example 8 | 70 degrees | $TiO_2$ | poor | 60.00% |
| Comparative Example 9 | 70 degrees | $Ta_2O_5$ | good | 62.30% |
| Comparative Example 10 | 70 degrees | $HfO_2$ | poor | 64.90% |
| Comparative Example 11 | 70 degrees | $Al_2O_3$ | good | 78.20% |
| Comparative Example 12 | 70 degrees | $Y_2O_3$ | good | 62.50% |

In the case of deposition angle θ=85 degrees, no peeling off occurred in the tape test of Examples 1 and 2 but the peeling off occurred in Comparative Examples 1 to 6. When the filling ratios in these cases were compared, the filling ratio was 40% or more in the Examples 1 and 2 in which the lanthanum oxide of ternary or more was used in an adhesion layer, while the filling ratio was 40% or less in Comparative Examples 2 to 6 in which other materials were used. Normally, when the dielectric body is stacked by oblique angle deposition, the filling ratio is low and the adhesion is not improved. However, it is found that, when the adhesion layer is formed by using the lanthanum oxide of ternary or more, a high filling ratio can be obtained also in stacking by oblique angle deposition. Although the reason why the adhesion layer made of the lanthanum oxide of ternary or more has a high filling ratio is not certain, it is assumed that the lanthanum oxide has high affinity for both materials of resin and metal. Moreover, regarding Comparative Example 1, it is assumed that adhesion between Al and resin as materials is not good.

In the case of deposition angle θ=70 degrees, no peeling off occurred in the tape test of Examples 3 and 4 of the present invention. In Comparative Examples 7 to 12, no peeling off occurred similarly in Comparative Examples 9, 11, and 12 but the peeling off occurred in Comparative Examples 7, 8, and 10. Considering the filling ratios in these cases, it is found that, when the filling ratio exceeds 60%, the peeling off can be suppressed not only in the lanthanum oxide of ternary or more but also in many dielectric materials. The filling ratio of the lanthanum oxide of ternary or more is equivalent to that of $Al_2O_3$ and is still higher than the other materials. The case where a significant difference in adhesion occurs is thus the case where the filling ratio is 60% or less.

In the aforementioned Examples and Comparative Examples, the adhesion of the metal oxide layer and the metal layer not subjected to patterning was evaluated for the sake of convenience. However, it is apparent that a similar evaluation result is obtained also when the metal oxide layer or the metal layer subjected to patterning is formed, as long as the same dielectric material is used for the metal oxide layer.

In the present invention, the filling ratio can be increased also in oblique angle deposition by using the lanthanum oxide of ternary or more in the adhesion layer on the resin substrate. An optical element having a metal layer with good adhesion can be thus provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-087898, filed May 25, 2021, which is hereby incorporated by reference herein in its entirety.

What is claimed is:

1. An optical element comprising:
   a resin substrate; and
   a stacked body including a metal oxide layer provided on the resin substrate and a metal layer provided on the metal oxide layer,
   wherein at least one of the metal oxide layer and the metal layer is subjected to patterning, and the metal oxide layer contains a lanthanum oxide of ternary or more, and
   wherein a filling ratio of the lanthanum oxide of ternary or more is 40% to 60%.

2. The optical element according to claim 1, wherein a surface of the resin substrate has lattice-shaped protruding portions.

3. An optical element comprising:
a resin substrate; and
a stacked body including a metal oxide layer provided on the resin substrate and a metal layer provided on the metal oxide layer,
wherein a surface of the resin substrate has lattice-shaped protruding portions, and the metal oxide layer contains a lanthanum oxide of ternary or more, and
wherein a filling ratio of the lanthanum oxide of ternary or more is 40% to 60%.

4. The optical element according to claim 1, wherein the optical element is a phase control element.

5. The optical element according to claim 4, wherein the phase control element is a polarization plate.

6. The optical element according to claim 5, wherein the polarization plate is a wire grid polarization plate having lattice shaped protruding portions on a surface of the resin substrate.

7. The optical element according to claim 6, wherein the lattice shaped protruding portions are formed at a fixed pitch and a height of the protruding portions is one to two times the pitch.

8. The optical element according to claim 1, wherein the resin substrate contains a resin selected from the group consisting of cyclo-olefin polymer, acrylic resin, polyethylene terephthalate, polycarbonate, and polyvinyl chloride.

9. The optical element according to claim 1, wherein the metal oxide layer is an oblique angle deposition film.

10. The optical element according to claim 1, wherein the lanthanum oxide of ternary or more contains at least one of Ti and Al as a metal element other than La.

11. The optical element according to claim 10, wherein the lanthanum oxide of ternary or more contains at least one selected from the group consisting of $La_2Ti_2O_7$, $LaTiO_3$, and $La_xAl_yO_z$, where $3x+3y=2z$.

12. The optical element according to claim 1, wherein the metal layer contains Al.

13. An optical element comprising:
a resin substrate; and
a stacked body including a metal oxide layer provided on the resin substrate and a metal layer provided on the metal oxide layer,
wherein the metal oxide layer contains a lanthanum oxide of ternary or more,
wherein the lanthanum oxide of ternary or more contains at least one selected from the group consisting of $La_2Ti_2O_7$, $LaTiO_3$, and $La_xAl_yO_z$, where $3x+3y=2z$, and
wherein the optical element is a wire grid polarization plate, and/or at least one of the metal oxide layer and the metal layer is subjected to patterning, and/or a surface of the resin substrate has lattice-shaped protruding portions.

14. A method of manufacturing the optical element according to claim 1, comprising a step of forming the metal oxide layer on the resin substrate and forming the metal layer on the metal oxide layer,
wherein, the metal oxide layer and the metal layer are successively formed in the same vapor deposition apparatus by a physical vapor deposition method, and
wherein the resin substrate and an evaporation source in the vapor deposition apparatus are arranged such that a normal direction of a substrate surface and a deposition direction form an angle of 70° to 85°.

15. An optical device comprising:
the optical element according to claim 1; and
at least one of an imaging element and a display element.

* * * * *